(12) United States Patent
Khan

(10) Patent No.: US 11,809,943 B2
(45) Date of Patent: Nov. 7, 2023

(54) WIRELESS NODE NETWORK TO ASSESS AND MODEL A PHYSICAL CHARACTERISTIC ASSOCIATED WITH AN OBJECT OR SPACE

(71) Applicant: MonoLets, Inc., Mountain View, CA (US)

(72) Inventor: Osama Khan, Mountain View, CA (US)

(73) Assignee: MonoLets, Inc., Mountain View, CA (US)

( * ) Notice: Subject to any disclaimer, the term of this patent is extended or adjusted under 35 U.S.C. 154(b) by 269 days.

(21) Appl. No.: 17/352,021

(22) Filed: Jun. 18, 2021

(65) Prior Publication Data

US 2022/0012441 A1     Jan. 13, 2022

Related U.S. Application Data

(60) Provisional application No. 63/050,110, filed on Jul. 9, 2020.

(51) Int. Cl.
*G06K 7/10*         (2006.01)
*H04B 17/318*     (2015.01)
(Continued)

(52) U.S. Cl.
CPC ..... *G06K 7/10405* (2013.01); *G06K 7/10366* (2013.01); *G06K 19/0776* (2013.01);
(Continued)

(58) Field of Classification Search
CPC .. G06K 7/10405; G06N 20/00; H04B 17/318; H04B 17/3913; H04W 84/18
See application file for complete search history.

(56) References Cited

U.S. PATENT DOCUMENTS 7,969,299 B2 * 6/2011 Hupp ................ G08B 13/1436
370/254
8,314,704 B2 * 11/2012 Cova ................ G06Q 10/0833
340/568.1
(Continued)

FOREIGN PATENT DOCUMENTS

CN        105407496 B  *   8/2018
EP          1738470 B1  * 12/2011 ........... H04L 1/0036
(Continued)

OTHER PUBLICATIONS

"International Search Report" and "Written Opinion", Patent Cooperation Treaty Patent Application No. PCT/US2021/041668, dated Oct. 19, 2021, 8 pages.
(Continued)

*Primary Examiner* — Christle I Marshall
(74) *Attorney, Agent, or Firm* — Carr & Ferrell LLP

(57) ABSTRACT

Exemplary embodiments include a wireless computing network to assess and model a physical characteristic associated with an object or space, the network including a plurality of wireless nodes located in a physical space, each of the plurality of wireless nodes configured to wirelessly communicate with at least one other wireless node in the network in a secure manner, attach to a physical object in the physical space via any adhesive means, utilize data from neighboring wireless nodes to generate or update an artificially intelligent machine learning model regarding a physical characteristic associated with the physical space and a gateway device in communication with each of the plurality of wireless nodes.

20 Claims, 3 Drawing Sheets

(51) Int. Cl.
  *G06N 20/00* (2019.01)
  *G06K 19/077* (2006.01)
  *H04W 84/18* (2009.01)
  *G06N 20/20* (2019.01)
  *H04B 17/391* (2015.01)
  *H04W 24/10* (2009.01)
  *H04W 24/04* (2009.01)

(52) U.S. Cl.
  CPC .......... *G06N 20/00* (2019.01); *H04B 17/318* (2015.01); *H04W 24/04* (2013.01); *H04W 24/10* (2013.01); *G06N 20/20* (2019.01); *H04B 17/3913* (2015.01); *H04W 84/18* (2013.01)

(56) References Cited

U.S. PATENT DOCUMENTS

| | | | |
|---|---|---|---|
| 10,511,289 | B2 | 12/2019 | Khan et al. |
| 10,639,509 | B2 * | 5/2020 | Skaaksrud ................ B60C 9/00 |
| 10,727,886 | B2 | 7/2020 | Pister et al. |
| 10,958,249 | B2 | 3/2021 | Khan et al. |
| 2006/0124738 | A1 | 6/2006 | Wang et al. |
| 2010/0026470 | A1 | 2/2010 | Wilson et al. |
| 2010/0039284 | A1 * | 2/2010 | Hall ....................... G06Q 10/08 340/8.1 |
| 2010/0289627 | A1 | 11/2010 | McAllister et al. |
| 2012/0013466 | A1 | 1/2012 | Olah |
| 2012/0013468 | A1 | 1/2012 | Olah |
| 2015/0139198 | A1 | 5/2015 | Hwang et al. |
| 2015/0319634 | A1 | 11/2015 | Zwirn |
| 2016/0183093 | A1 * | 6/2016 | Vaughn ................... H04L 63/14 455/528 |
| 2018/0218205 | A1 | 8/2018 | Csaszar et al. |
| 2019/0058459 | A1 | 2/2019 | Khan et al. |
| 2019/0156166 | A1 | 5/2019 | Karthikeyan et al. |
| 2019/0280725 | A1 | 9/2019 | Pister et al. |
| 2019/0294833 | A1 | 9/2019 | Lu et al. |
| 2020/0073834 | A1 | 3/2020 | Hagdahl et al. |
| 2020/0083869 | A1 | 3/2020 | Khan et al. |
| 2021/0234562 | A1 | 7/2021 | Pister et al. |
| 2022/0020256 | A1 | 1/2022 | Khan |

FOREIGN PATENT DOCUMENTS

| | | | | |
|---|---|---|---|---|
| EP | 3220819 B1 * | 9/2021 | ........... | A61B 5/1124 |
| WO | WO2019108956 A1 | 6/2019 | | |
| WO | WO2022010637 A1 | 1/2022 | | |
| WO | WO2022015875 A1 | 1/2022 | | |

OTHER PUBLICATIONS

"International Search Report" and "Written Opinion", Patent Cooperation Treaty Patent Application No. PCT/US2021/038289, dated Sep. 15, 2021, 7 pages.

* cited by examiner

WIRELESS NODE NETWORK TO ASSESS AND MODEL A PHYSICAL CHARACTERISTIC ASSOCIATED WITH AN OBJECT OR SPACE

CROSS-REFERENCE TO RELATED APPLICATIONS

The present application claims the priority benefit of U.S. Provisional Patent Application Ser. No. 63/050,110 filed on Jul. 9, 2020, titled "Wireless Node Network to Assess and Model a Physical Characteristic Associated with an Object or Space," which is hereby incorporated by reference in its entirety.

FIELD OF INVENTION

The present technology pertains to systems and methods for creating and maintaining a wireless mesh network of nodes to assess and model a physical characteristic associated with an object or space.

SUMMARY OF EXEMPLARY EMBODIMENTS

Exemplary embodiments include a wireless computing network to assess and model a physical characteristic associated with an object or space, the network including a plurality of wireless nodes located in a physical space, each of the plurality of wireless nodes configured to wirelessly communicate with at least one other wireless node in the network in a secure manner, attach to a physical object in the physical space via any adhesive means, utilize data from neighboring wireless nodes to generate or update an artificially intelligent machine learning model regarding a physical characteristic associated with the physical space and a gateway device in communication with each of the plurality of wireless nodes.

Each wireless node, according to exemplary embodiments, has a processor, a memory and a sensor. In some cases, the sensor is a temperature sensor and the artificially intelligent machine learning model is a thermal model of the physical space. The thermal model of the physical space may be configured to estimate heat propagation. In various exemplary embodiments, the thermal model is on each wireless node and is configured to predict a neighboring wireless node's temperature data when actual temperature data is not received from the neighboring wireless node.

In some exemplary embodiments, each wireless node may be configured to measure inertia and the artificially intelligent machine learning model may be a motion detection model. According to some exemplary embodiments, each wireless node may be configured to measure a radio frequency and the artificially intelligent machine learning model is a radio frequency propagation model. The radio frequency may be measured by a received signal strength indicator of a radio frequency packet from neighboring wireless nodes and a collection of received signal strength indicators of radio frequency packets from neighboring wireless nodes may be used to model radio frequency propagation for a pallet. In some cases, the model radio frequency propagation for the pallet can differentiate between types of products on the pallet.

Exemplary embodiments also include each wireless node configured to report a number of items present in a physical space. Each wireless node may be attached to a physical object and have a unique identifier. Each wireless node may report to each other without requiring a gateway device and when a gateway arrives within range, a summary of a cycle count may be transmitted and displayed on a computing device.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
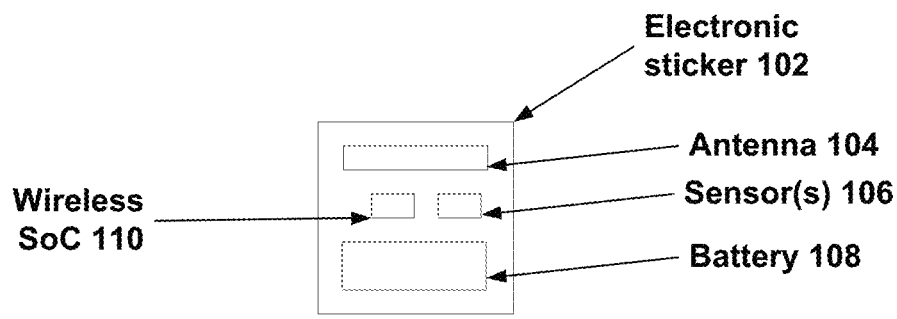
FIG. 1 depicts an exemplary electronic sticker.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

Embodiments of the present disclosure relate to an electronic sticker that can be attached to any physical item for tracking, provisioning, quantification of item, or for measurement of any number of characteristics. In exemplary embodiments, the electronic sticker is capable of being attached to any physical item via any attachment means, adhesive, mechanical, or otherwise.

In an exemplary embodiment, the electronic sticker is a specially designed and manufactured hardware computing chip with external components either attached or printed directly onto the chip. The external components may be any one or more of an attached or printed antenna (to enable wireless communications), a power source (such as a printed battery, or energy harvester), and a sensor. The electronic sticker also has wireless firmware, to enable end to end encrypted communications over any wireless network.

Each electronic sticker is a wireless node in a communications network of a plurality of wireless nodes. Each electronic sticker can communicate with other neighboring wireless stickers using standard protocols and communication technologies like Bluetooth, Bluetooth Low Energy (BLE), IEEE 802.15.4, WiFi, etc. The electronic stickers can be composed in any configuration to form a full or partial mesh network. Further, each electronic sticker is capable of connecting to one or more centralized gateways, such as a WiFi access point, cell phone, tablet, laptop computer, desktop computer, cellular gateways, Low Power Wide Area Network (LPWAN) gateways, satellite gateways, or any other computing device. The electronic stickers are akin to edge devices in a wireless mesh network.

FIG. 1 depicts an exemplary electronic sticker 102, which also acts as a wireless node in a communication network as discussed herein. The sticker 102 may have an antenna 104. The antenna may be printed directly onto the hardware chip, or separately attached. Sticker 102 may also have one or more sensor(s) 106. In exemplary embodiments, sensor(s) 106 may be any of a temperature sensor, clock, humidity sensor, or any other type of sensor relating to a characteristic for measurement. Sticker 102 also comprises battery 108, which may be a printed battery printed directly onto the hardware chip. Wireless SoC 110 (wireless chip) may also be a part of sticker 102, enabling wireless communication capability for sticker 102, such that sticker 102 acts as a wireless node in a computing network. While not expressly depicted, other components may also be present on sticker 102. Further, the components of sticker 102 may be of differing size or in a differing location on sticker 102 than shown in the exemplary figure.

Sticker 102 may be of any size practical for attachment to an object. In an exemplary embodiment, the electronic sticker may be 2 cm×2 cm.

Wireless SoC 110 may be of a size practical for inclusion on sticker 102. In exemplary embodiments, the chip is 1 square millimeter in size. In other embodiments, the wireless SoC can be of other sizes, such as 6 square millimeters (3 mm×2 mm), 4 square millimeters (2 mm×2 mm), or any other size.

Figure 2:
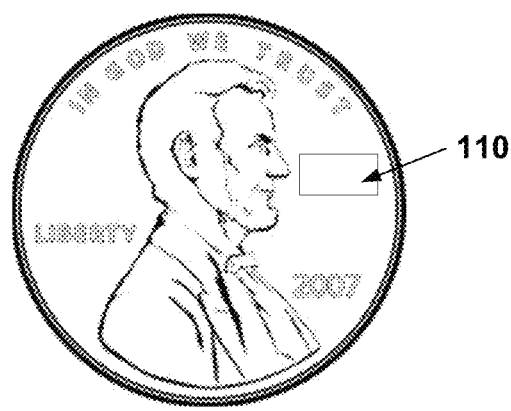
FIG. 2 depicts an exemplary embodiment of wireless SoC.

FIG. 2 depicts an exemplary embodiment of wireless SoC, to show a relative size of wireless SoC in comparison to a penny in US currency.

Figure 3:
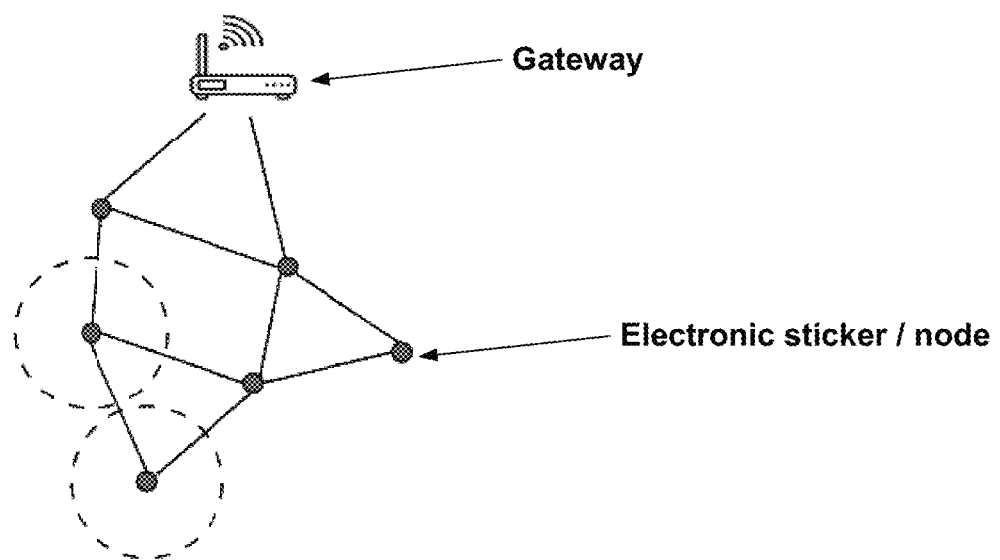
FIG. 3 depicts an exemplary network of electronic stickers as wireless nodes, in communication with one another and a gateway.

FIG. 3 depicts an exemplary network of electronic stickers as wireless nodes, in communication with one another and a gateway. While only a few nodes are depicted in FIG. 3 for simplicity, there can be millions of nodes in a network. Further, while not expressly depicted in the figure, there can be any number of other components in the network as well, such as routers, switches, actuators, drones, handheld computing devices, robots, industrial robots and/or other devices.

Consider an imaginary spherical volume of an arbitrary radius, with a wireless sensor located at the center of this sphere. This volume of space per sensor is used to discretize the 3-dimensional space over which the wireless network is deployed. The wireless sensor located at the center of this imaginary sphere can either use a physics-based model or an empirical model derived from the data of the underlying physical quantity being measured by the wireless sensor. The model then can be used to predict or extrapolate the physical quantity over the boundary of the sphere.

A node in the wireless sensor node can transmit this boundary information to a neighboring node. The receiving node can then use this information as a boundary condition in its physical or empirical model to improve its estimate or prediction of the physical quantity. By successively repeating this process over many wireless sensor nodes, a more accurate model can be achieved that can be used to estimate or predict future values of the physical quantity being measured over the 3D space over which wireless network is deployed.

As discussed herein, the wireless nodes in a wireless mesh network can transmit the raw wireless sensor data to a gateway device for model estimation or can only transmit the updated model parameters to save communication bandwidth. The gateway device can also create its own predictive model either from the raw data or from the updated model parameters of the 3D space over which the wireless network is deployed. If a new wireless sensor node is deployed, joins the network and takes a new measurement, the measurement process is repeated throughout the network to update the physical or empirical model.

Exemplary Use Case—Temperature Sensing

In an exemplary use case, objects are stored in a warehouse or a semi-truck. Each object has an electronic sticker placed on it. In one embodiment, the sensor on each electronic sticker is a temperature sensor. By periodically measuring and recording temperature data of the physical space where each electronic sticker (and corresponding object) is located, each electronic sticker can create and continually update a thermal model of the physical space.

Since each electronic sticker has its own local computing capabilities, including a processor and memory, each sticker can make its own local temperature measurement, incorporate data from neighboring stickers, and iterate on this data to create an updated temperature model of the physical space. By doing this repeatedly over time, an accurate thermodynamics model of the 3-dimensional space where the sticker is deployed can be created and maintained in real-time or substantially real-time. Additionally, heat propagation may be estimated in a physical space, including a truck, ship or the like, and even microclimates may be determined for the physical space.

Further, some of the wireless links may have loss of data due to collisions, delayed or lost packets, link failures, etc. Thus, each node can have an artificially intelligent machine learning model operating locally on the device. With this model, each node can predict a neighboring node's temperature data when the actual data is not received from the neighboring node. The node can make an intelligent guess to fill in the missing data and update the model on a periodic basis.

Each electronic sticker can transmit either all of the raw data to the gateway, or transmit only select pieces of information, such as the higher-level information of the model, certain model parameters, etc. The specific data transmitted to the gateway and the time interval at which the data is transmitted to the gateway may be customizable. The frequency of transmission and the cost of transmission are important factors for bandwidth limitations. Alternatively, or additionally, data can be transmitted from an electronic sticker directly to a user computing device (such as a smartphone, table, smartwatch, laptop, etc.) or from a gateway to a user computing device. The gateway device may transmit this information to a cloud using backhaul communication either through wired or wireless infrastructure.

While temperature sensors are discussed herein in this exemplary use case, any type of sensor may be utilized.

Exemplary Use Case—Motion Detection

Another example of wireless network processing is to create a real-time motion detection model of the 3D space over which the wireless network is deployed. Every node can take an inertial measurement (e.g., 9 axis IMU) and share this information with its neighbors which can then incorporate this information to update their model. The process is repeated iteratively throughout the network. The raw data or updated model parameters can be transmitted to a gateway device. The gateway device may transmit this information to a cloud using backhaul communication either through wired or wireless infrastructure.

Exemplary Use Case—RF Propagation Model

Another example of wireless network processing is to create a real-time Radio Frequency ("RF") propagation model of the 3D space over which the wireless network is deployed. Every node can take an RF field strength measurement and share this information with its neighbors which can then incorporate this information to update their model. The process is repeated iteratively throughout the network. The raw data or updated model parameters can be transmitted to a gateway device. The gateway device may transmit this information to a cloud using backhaul communication either through wired or wireless infrastructure. For example, stickers can be attached to boxes or other items on a pallet having numerous items. Through the mesh network, the sensors associated with the stickers in the three-dimensional space compute the RF propagation model of the pallet. If there are metal products on the pallet, it influences the RF propagation model. If there are liquid products on the pallet, it influences the RF propagation model. Thus, the type of products on a particular pallet may be determined. Specifically, each sensor can record the received signal strength indicator ("RSSI") of the RF packet it is receiving from its neighboring sensors. Collectively, this data can be sent to the cloud or to a gateway device. This collection of RSSI values from all the sensors can be used to better estimate or model the RF propagation for a pallet.

The concept can be extended with any sensing modality e.g., pressure sensors, gas sensors, bio-chemical sensors and so on. In these example scenarios, if any information is missing from a neighbor node due to loss RF packets the missing information can be filled with predicted value or using interpolation or extrapolation.

Exemplary Use Case—Cycle Counting

In another exemplary use case, the network of electronic stickers can be used for inventory management. Each sticker is attached to a physical object (a box, piece of paper, envelope, item, etc.). Every sticker or label has a unique identifier. By communicating with neighboring nodes, each node can report a number of items present in a physical space and report that to a gateway, the cloud, a local edge device, a handheld computing device, robot, industrial robot, drone, laptop, smartphone, tablet, etc. Additionally, each node can report to each other without requiring a gateway device.

Figure 4:
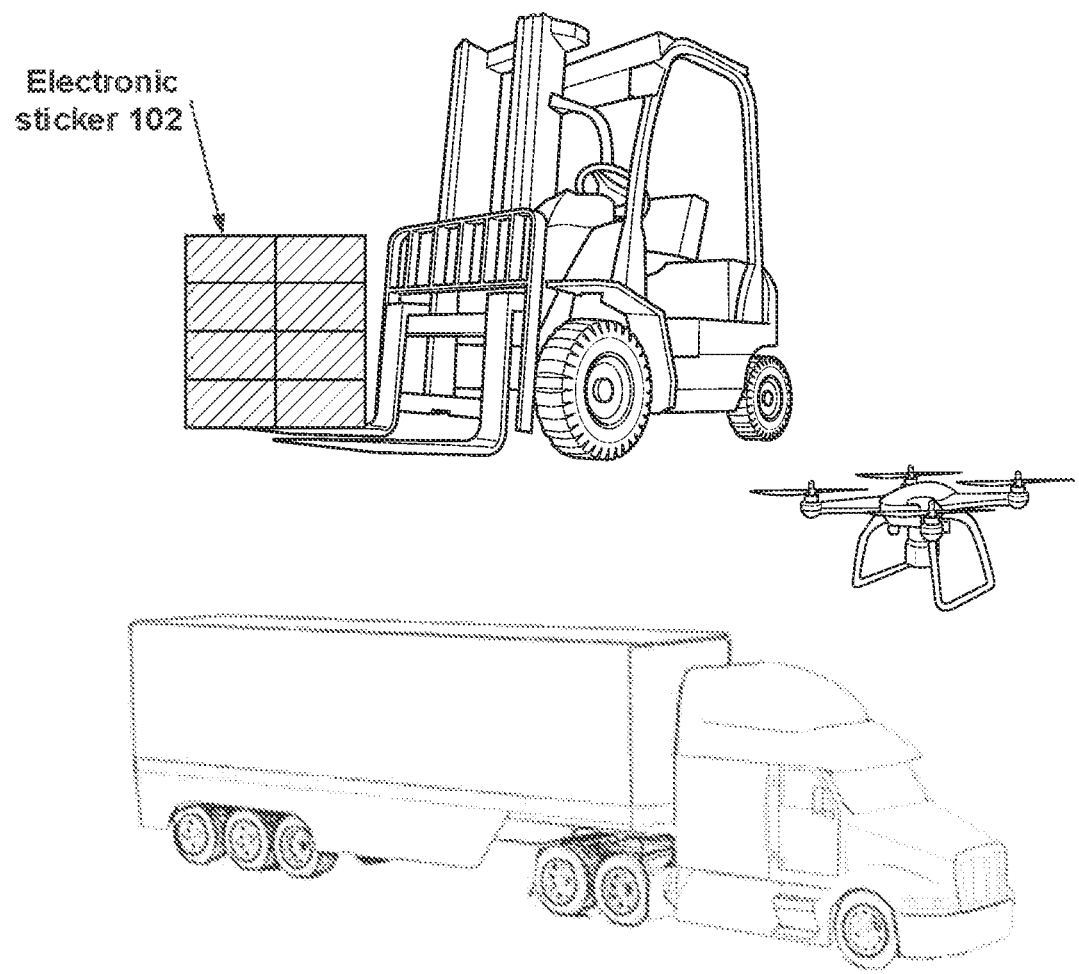
FIG. 4 shows an exemplary environment with a group of boxes on a pallet of a forklift.

FIG. 4 shows an exemplary environment with a group of boxes on a pallet of a forklift. Each box on the pallet has an electronic sticker placed on it. Each of these stickers are communicating with one another and conducting a cycle count of the number of objects present. The raw data, and/or a summary of the items present on the pallet can be sent to a handheld computing device (such as a smartphone, smartwatch, tablet), or any other computing device (such as a computer, drone, robot, industrial robot, etc.), or to a gateway that is attached to the forklift or nearby semi-truck in real-time or substantially real-time. The gateway device may transmit this information to a computing cloud using backhaul communication either through wired or wireless infrastructure. The wireless network can also perform checksum computation to verify that all goods are present, and none is missing.

Each node can either transmit raw information to a gateway and the gateway can compute the cycle count, or each node can conduct local computation, including but not limited to, checksum operations, to check with each other what each corresponding object contains. Then this summary may be presented to the gateway. By conducting local computations, cycle counting of numerous items (such as items on a pallet) can go much faster. Further, it may be advantageous to submit model information instead of raw information to the gateway based on the customer use case and the RF environment. Additionally, it may not always be possible to transmit raw data from each node to the gateway at a regular schedule, due to density and scale of nodes, wireless capacity limitation, bandwidth limitations, and/or battery limitations. In these scenarios, it is advantageous to have local computation at each node.

In other embodiments, a network of nodes can effectuate cycle counting without any gateway. That is, each node in the network can communicate with one another to conduct the cycle counting, without reporting to a centralized gateway at regular intervals. When a gateway arrives within range (such as through a person walking up with a smartphone), then a summary of the cycle count can be displayed on the person's smartphone, via a dedicated application operating on the smartphone or through a push notification, text message, standard BLE advertisement beacons or other means. The gateway can be any computing device, mobile or stationary.

Other Exemplary Uses Cases

In another exemplary use case, 1-10 million nodes may be deployed in a large warehouse, with multiple gateways communicating with each other. A gateway may be a Wi-Fi access point that is already deployed in the warehouse infrastructure, wired to back haul infrastructure, and connected to a computing cloud. Once an electronic sticker (edge device) connects to the gateway, it is connected to the Internet at that point.

In other exemplary use cases, the electronic sticker nodes can be deployed in any physical space, stationary or mobile. For example, electronic stickers can be placed on objects that are in transit, such as in a truck, airplane, railroad, ship, etc. When the objects are in transit and in motion, the electronic stickers can aid in gleaning information about what is happening with the attached objects in real time.

Further, in various scenarios the nodes may be communicating with one another without regular transmissions to a gateway. For example, products may be offloaded from a truck and there is no gateway within the truck. A forklift may come in and unload the pallet. In these cases, a drone may fly by, or a person may walk by with a computing device, and an automated summary is transmitted by one or more of the nodes to the drone or computing device. Prior systems require a person to manually read all individual labels of objects with a handheld device, such as a barcode scanner or QR code scanner. By attaching an electronic sticker to each object, and each sticker acting as a wireless node in a network, cycle counting can be achieved automatically, significantly reducing manual human labor cost and time associated with real-time inventory updates.

In the description, for purposes of explanation and not limitation, specific details are set forth, such as particular embodiments, procedures, techniques, etc. in order to provide a thorough understanding of the present technology.

While specific embodiments of, and examples for, the system are described above for illustrative purposes, various equivalent modifications are possible within the scope of the system. For example, while processes or steps are presented in each order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology. Thus, the breadth and scope of a preferred embodiment should not be limited by any of the above-described exemplary embodiments.

What is claimed is:

1. A wireless computing network to assess and model a physical characteristic associated with an object or space, the wireless computing network comprising:
   a plurality of wireless nodes located in a physical space, each of the plurality of wireless nodes configured to:
   wirelessly communicate with at least one other wireless node in the network in a secure manner;
   attach to a physical object in the physical space via any adhesive means; and
   utilize data from neighboring wireless nodes to generate or update an artificially intelligent machine learning model regarding a physical characteristic associated with the physical space; and
   a gateway device in communication with each of the plurality of wireless nodes.

2. The wireless computing network to assess and model the physical characteristic associated with the object or space of claim 1, further comprising each wireless node having a processor and a memory.

3. The wireless computing network to assess and model the physical characteristic associated with the object or space of claim 2, further comprising each wireless node having a sensor.

4. The wireless computing network to assess and model the physical characteristic associated with the object or space of claim 3, wherein the sensor is a temperature sensor.

5. The wireless computing network to assess and model the physical characteristic associated with the object or space of claim 4, wherein the artificially intelligent machine learning model is a thermal model of the physical space.

6. The wireless computing network to assess and model the physical characteristic associated with the object or space of claim 5, wherein the thermal model of the physical space is configured to estimate heat propagation.

7. The wireless computing network to assess and model the physical characteristic associated with the object or space of claim 6, wherein the thermal model is on each wireless node.

8. The wireless computing network to assess and model the physical characteristic associated with the object or space of claim 7, wherein each wireless node is configured to predict a neighboring wireless node's temperature data when actual temperature data is not received from the neighboring wireless node.

9. The wireless computing network to assess and model the physical characteristic associated with the object or space of claim 1, further comprising each wireless node configured to measure inertia.

10. The wireless computing network to assess and model the physical characteristic associated with the object or space of claim 9, wherein the artificially intelligent machine learning model is a motion detection model.

11. The wireless computing network to assess and model the physical characteristic associated with the object or space of claim 1, further comprising each wireless node configured to measure a radio frequency.

12. The wireless computing network to assess and model the physical characteristic associated with the object or space of claim 11, wherein the artificially intelligent machine learning model is a radio frequency propagation model.

13. The wireless computing network to assess and model the physical characteristic associated with the object or space of claim 12, wherein the radio frequency is measured by a received signal strength indicator of a radio frequency packet from the neighboring wireless nodes.

14. The wireless computing network to assess and model the physical characteristic associated with the object or space of claim 13, wherein a collection of received signal strength indicators of radio frequency packets from the neighboring wireless nodes are used to model radio frequency propagation for a pallet.

15. The wireless computing network to assess and model the physical characteristic associated with the object or space of claim 14, wherein the modeled radio frequency propagation for the pallet can differentiate between types of products on the pallet.

16. The wireless computing network to assess and model the physical characteristic associated with the object or space of claim 1, further comprising each wireless node configured to report a number of items present in the physical space.

17. The wireless computing network to assess and model the physical characteristic associated with the object or space of claim 16, wherein each wireless node is attached to the physical object.

18. The wireless computing network to assess and model the physical characteristic associated with the object or space of claim 17, wherein each wireless node has a unique identifier.

19. The wireless computing network to assess and model the physical characteristic associated with the object or space of claim 18, wherein each wireless node can report to each other without requiring the gateway device.

20. The wireless computing network to assess and model the physical characteristic associated with the object or space of claim 19, wherein when a gateway arrives within range, a summary of a cycle count is transmitted and displayed on a computing device.

* * * * *